(12) United States Patent
Villa et al.

(10) Patent No.: US 7,842,206 B2
(45) Date of Patent: Nov. 30, 2010

(54) PROCESS AND PLANT FOR CONTINUOUS MANUFACTURE OF RESTING ARTICLES OF LATEX FOAM

(75) Inventors: Renzo Villa, Cassano d'Adda (IT); Alain Bruno Serge Marié, Rumigny (FR); Régis Francois Jean Marie Vernet, Amiens (FR)

(73) Assignee: Sapsa Bedding SRL, Milano (IT)

( * ) Notice: Subject to any disclaimer, the term of this patent is extended or adjusted under 35 U.S.C. 154(b) by 423 days.

(21) Appl. No.: 11/436,054

(22) Filed: May 18, 2006

(65) Prior Publication Data

US 2007/0228594 A1 Oct. 4, 2007

(30) Foreign Application Priority Data

Apr. 4, 2006 (IT) .......................... MI2006A0657

(51) Int. Cl.
  B29C 44/24 (2006.01)
  B29C 44/28 (2006.01)
  B29C 44/46 (2006.01)

(52) U.S. Cl. .......................... 264/45.8; 264/51; 425/112

(58) Field of Classification Search ............ 264/173.11, 264/174.11, 45.8
See application file for complete search history.

(56) References Cited

U.S. PATENT DOCUMENTS

| 2,586,275 | A | * | 2/1952 | Toulmin, Jr ................. 264/45.8 |
| 2,757,415 | A | * | 8/1956 | Mathues et. al. ............ 264/213 |
| 5,229,138 | A | | 7/1993 | Carotti |
| 6,086,802 | A | | 7/2000 | Levera et al. |
| 6,312,244 | B1 | | 11/2001 | Levera et al. |
| 6,608,802 | B1 | | 8/2003 | Maeda et al. |
| 2003/0209827 | A1 | * | 11/2003 | Levera et al. ................. 264/51 |
| 2005/0177950 | A1 | | 8/2005 | Niederoest et al. |

FOREIGN PATENT DOCUMENTS

| EP | 0 184 466 A2 | 6/1986 |
| EP | 0380963 | 8/1990 |
| EP | 1361033 | 11/2003 |
| GB | 879791 | 10/1961 |

\* cited by examiner

Primary Examiner—Philip C Tucker
Assistant Examiner—Alison Hindenlang
(74) Attorney, Agent, or Firm—Novak Druce + Quigg LLP

(57) ABSTRACT

Process for continuous manufacture of an unlimited length latex foam block including at least two layers to form after successive cross cuts resting articles such as mattresses, cushions and parts of such articles. At least a first and second latex foam mixture with different characteristics among them are separately prepared and sent consecutively at a predetermined distance from each other on a laying surface in continuous progress. The second mixture is deposited on the already shaped first layer. The first and the second layers are gelatinized concurrently at the same place. The two layers are directly joined to each other along the contact surface by mechanical co-penetration of appendices of the one into micro-cavities of the other and by reciprocal tack of the two layers latex particles following breaking of the protective barrier between particles during gelatinizing.

29 Claims, 5 Drawing Sheets

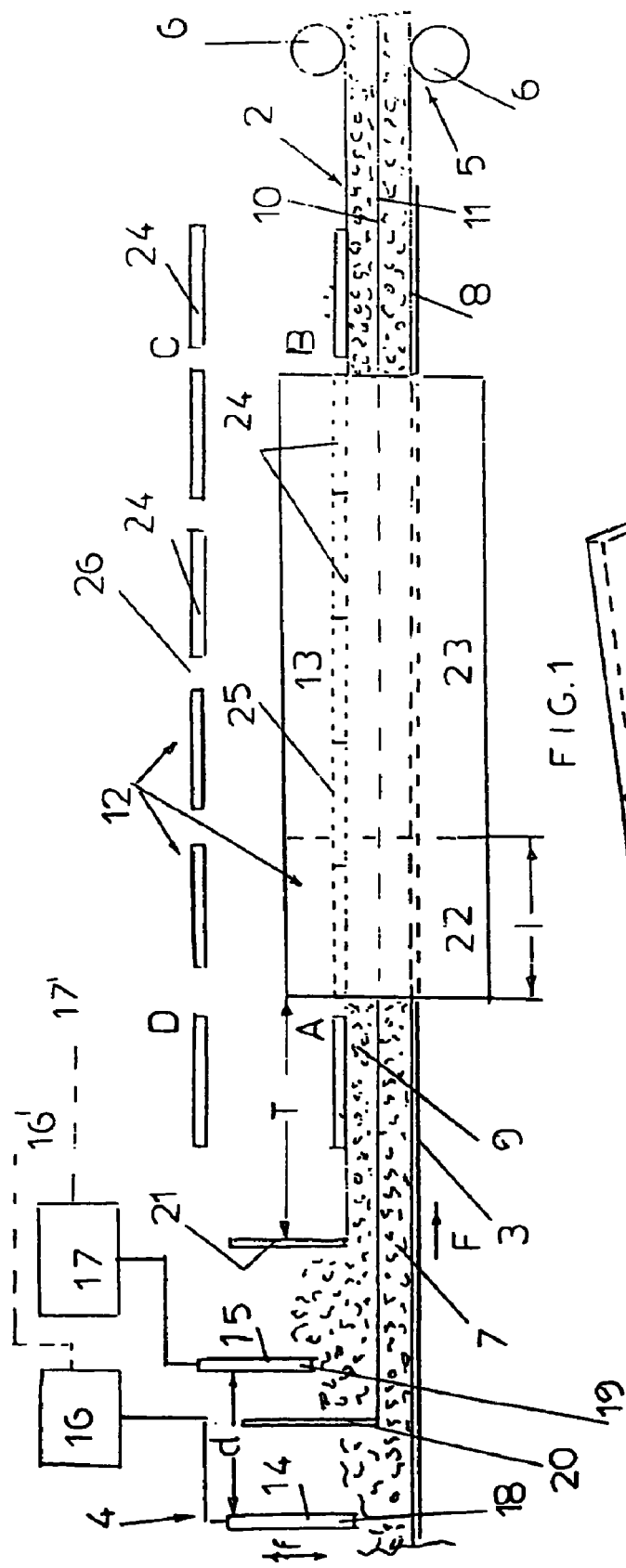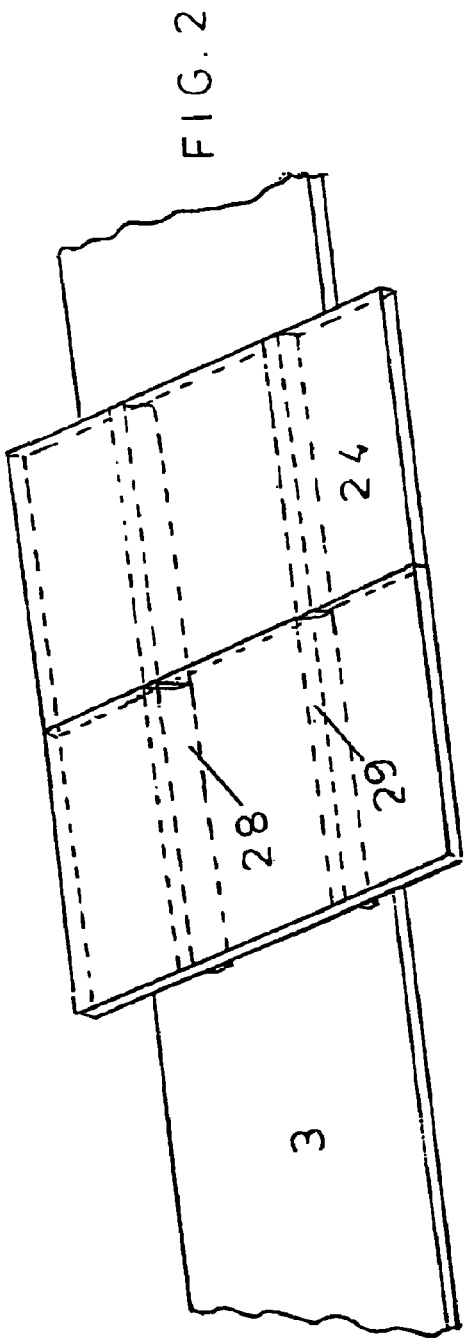

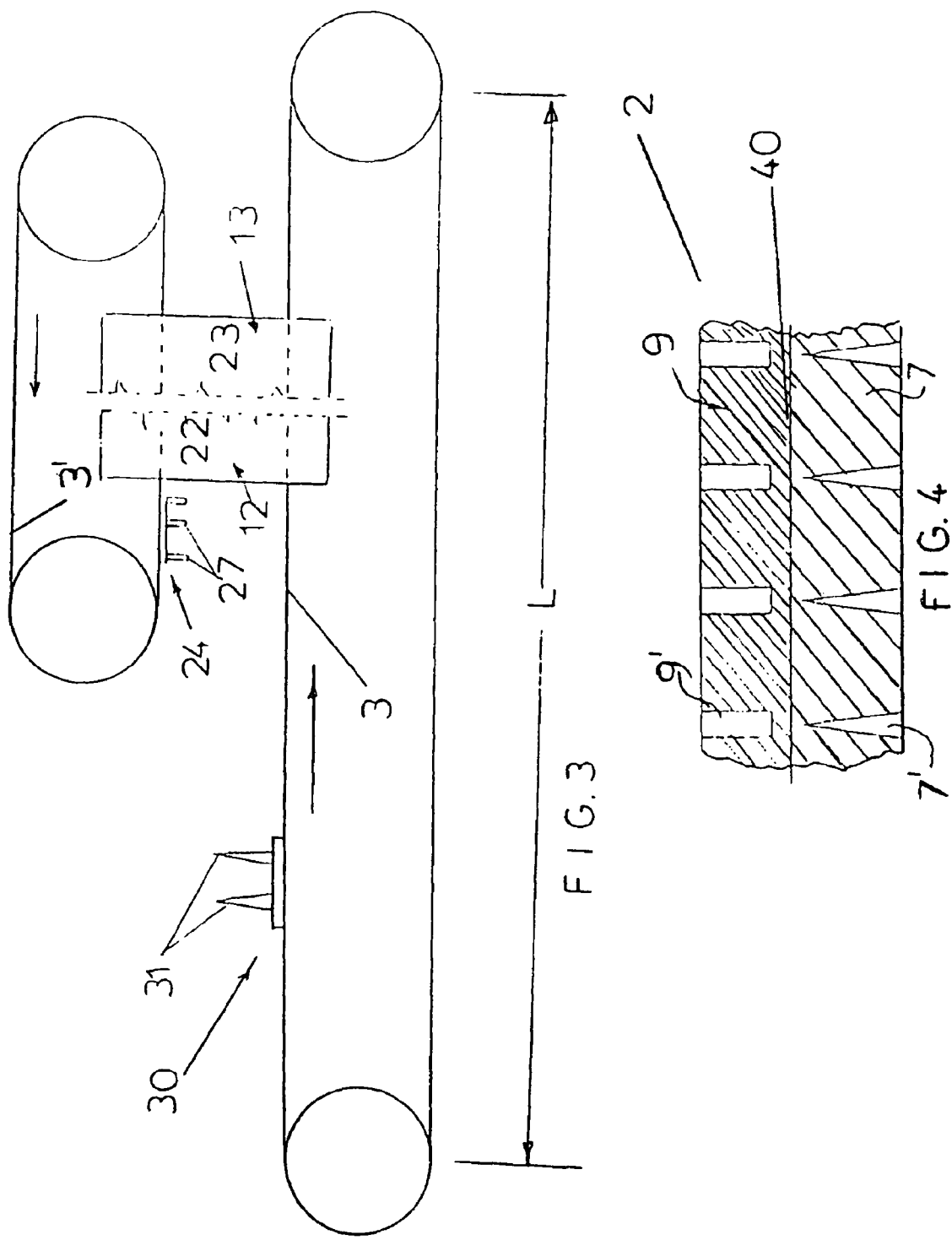

PROCESS AND PLANT FOR CONTINUOUS MANUFACTURE OF RESTING ARTICLES OF LATEX FOAM

FIELD OF THE INVENTION

The present invention relates to continuous manufacture of latex foam resting articles and more specifically to continuous manufacture of a latex foam block formed by at least two layers of unlimited length at least partially overlaid and chemically bonded to one another.

DISCUSSION OF BACKGROUND OF THE INVENTION

Processes are known for manufacture of latex foam resting articles, such as for instance mattresses, mattress parts, cushions and the like.

The above mentioned articles manufacture is carried out both by single moulds and by unlimited length moulds such as a belt or a cart or plate series continuously moving along an annular configuration.

Such continuous processes are used and described in the assignee patents EP-B-0.380.963, U.S. Pat. No. 5,229,138, U.S. Pat. No. 6,086,802, EP-A-1.361.033.

A single mould generally comprises a hollow lower part and an upper part forming the cover, the former and the latter or both are also provided with protuberances for recesses formation.

As it is known, initially a latex and its components comprising mixture is prepared.

Latex is an elastomer polymer dispersion in an aqueous serum.

Herein following the term "components" means all those substances, materials, ingredients and/or fillers whose presence is thought being useful to carry out optimally latex foam article manufacture steps with determined and desired characteristics.

Generally said "components" include surfactants, thickening agents, gelation agents, stabilizers, process accelerators, vulcanization agents, fillers, and anti-oxidizers.

The process employs a tank within which various components are added to a synthetic or natural latex mixture.

The raw components prior to their addition to latex are transformed into an aqueous dispersion using grinders to reduce particles to a few microns size.

Among the most significant components are the surface active and gelation agents.

As it is known, surfactants determine the presence around each single latex particle of a protective barrier opposing their approach; such barrier being formed by electric charges all of the same sign for all latex particles such that they repel each other avoiding a premature and undesired particle coagulation.

Gelation agents have the task of breaking the abovementioned barrier such that various latex particles, no longer subject to repulsion forces may come near or away from each other being subject to vibrations increasing with temperature increase.

During such alternating motion latex particles touch and unite each other carrying out latex coagulation.

Referring back to the mould manufacture process, to the latex and its components comprising mixture in the container a pressurized gas is added and the mixture is agitated at high speed until its foaming is obtained.

A determined solution of a gelation agent destined to carry out the gelating step is added to the latex foam.

At this time, to further clarify the present invention field of application we recall briefly herein that latex foam resting articles have characteristics and process steps different from other foam articles, for instance polyurethane foam.

As far as the process steps one should remember that latex article foaming is achieved inputting an external agent such as pressurized air in the mixture.

In contrast, polyurethane mixture foaming is achieved by direct contact among polyol and isocyanate, that are the same base materials making up polyurethane.

Further latex foam articles have a structure provided with tiny open and uniformly distributed cells for all material thickness, polyurethane foam articles have closed cells except specific polyurethanes in which cells are blown up after specific treatments.

A latex foam article manufacture envisages filling up the mould with a mixture comprising latex and components already subjected to foaming.

It is to be noted that after foaming the latex mixture is very unstable such that a risk exists of a collapse of cell walls.

With the aim of dealing with such risk the gelating step is carried out.

Gelating may be defined as a homogeneous coagulation in that part of foam aqueous serum is embedded among rubber polymer particles.

Chemically gelating is the transition from "sol" phase to "gel" phase.

The gelating step avoids latex foam collapse after deposit.

The following vulcanization step is carried out to determine the highest elasticity degree in the final article that is the elastic deformation, density and uniformity article characteristics that will assure comfort conditions for the user in a rest state.

During the vulcanization step the mould is heated going through a tunnel within which steam is supplied.

At the end of the vulcanization step the mould upper part is rotated or it is lifted with respect to the hollow lower part to allow for article extraction.

In view of the above, it is to be noted that resting articles may be made up by many layers to each of which a specific, density, hardness or mechanical or chemical strength to provide specific performances, characteristic is attributed.

Generally such articles, particularly mattresses, are assembled joining various layers one to another using glues or adhesives.

Unfortunately such technique is un-satisfactory.

As a matter of fact gluing materials are toxic and anyway do not guarantee a lasting attachment between layers.

It may be envisaged to realize multiple layers articles by pouring in an open mould a first latex foam followed by a second latex foam with different characteristics from the first one.

Anyway in such case, because the two mixtures are substantially liquid, one would have a remixing of the two mixture with ensuing variation of the two layers preestablished geometry.

The final article would not benefit from layers separate one from the other by a neat boundary surface.

Therefore one would obtain an article with a fuzzy physical or chemical characteristic and with ensuing unwanted performance.

In case of mould with a cover it is to be noted that the foam material filling up in a foam is as a rule carried out with excess material relative to available volume in the mould cavity.

Therefore during the cover closing the upper mixture would be compressed against the lower mixture with the two mixtures obvious un-homogeneous distribution.

One may envisage using a multi-layered latex foam mattress continuous manufacture process.

Anyway even in such case injecting the second mixture onto the first one at a laying station, would not provide results different from the above mentioned ones for single open moulds.

SUMMARY OF THE INVENTION

It was envisaged then that it might be possible to find a solution to the prior encountered problems by performing a continuous manufacture process for latex foam articles, such as mattresses and the like, formed by at least two layers, overlaid and directly united to one another, paying attention to spacing by a predetermined distance the second layer deposit onto the first one and resorting to gravity joining one onto the other.

It has been realized that such process would provide useful results with the same latex foam cellular structure able to allow at the two layers contact level a reciprocal co-penetration of tiny appendices of the one in the multiple microcavities of the other.

Therefore a first aspect of the invention provides a continuous process for manufacturing a latex foam block of un-limited length to be partitioned in an article plurality cut transversally to said un-limited length, comprising the steps of preparing a latex made up by various particles and by a surfactant to originate a barrier opposing the approach among said latex particles, to form a first latex and components base mixture, introducing in said first base mixture a foaming agent, foaming the first base mixture, introducing a gelation agent for breaking such barrier, advancing along a predetermined direction a laying surface between a first and a second station, laying in said first station said first base mixture onto that laying surface in continuous advancement and forming a first latex foam of un-limited length layer, shaping to a predetermined height such first base layer, gelating, and vulcanizing.

The process comprises the following inventive steps of:

a) preparing at least a second latex foam mixture comprising various components among which are said surfactant and such gelation agent;

b) differentiating the second mixture characteristics from the first mixture ones;

c) laying after the first layer leveling step said second mixture over at least a first base layer partial cross extension and forming at least a second upper latex foam layer;

d) shaping said second layer up to a predetermined height;

e) gelating such second layer;

f) vulcanizing concurrently said two layers;

g) advancing said second latex foam block formed by said two layers towards the second station.

The process in its broadest form uses, as previously mentioned, the second mixture deposition step onto at least a cross partial extension of said first base layer.

Therefore, one may deposit plural contiguous layers over the first layer, even of different cross size, all positioned on a plane and all directly joined to one another and for the whole cross dimension to the first layer.

Any such contiguous layers may have similar properties or differentiated ones with respect other layers on the same plane.

Preferably the upper layer has the same length as the base layer.

The previously mentioned situation can be repeated, if requested, for numbers of layers greater than the at least two layers and for layers deposited over parallel planes and overlaid in a number greater than two.

Conveniently the process is characterized by gelating said two layers in the same position and concurrently joining together contiguous surfaces of said two layers through latex particles after such barrier breakage.

In fact one might determine a high direct adhesion among the two layers by the cited parts co-penetration of a layer into the other also exploiting chemical bonding achieved for both layers during transition between the foam un-stability condition to the stability one.

It was found that if the barrier among latex particles layers contrasting their approach, concurrently broke down, the particles of one layer contacted the particles of the other layer, with the result of exploiting their tack, due to their still plastic state, to create a chemical bond between the two layers.

Conveniently, the process comprises preparation of two different composition mixtures using natural and synthetic rubber latex or separately between them in the two layers or according to a combination between the two rubber types.

The two mixture compositions may differentiate for the presence of ingredients and/or substances apt to provide specific characteristics, for instance to obtain variations of one layer to the other such as hardness, elastic deformation, and mechanical strength.

Advantageously the process is characterized in that it uses two similar composition latex mixtures and in that it differentiates the mixtures with the second mixture foaming step with an air amount different from the first base mixture.

Still advantageously the process is characterized in that it adds flame retarding material fillers to at least one of said mixtures, for instance to the mixture destined to form the upper layer.

In another embodiment the process is characterized in that it uses a latex foam mixture for one or both of the two layers with viscous-elastic characteristics.

Preferably the process is characterized in that the ratio between the second mixture and the first base mixture density is between 1 and 10.

Still preferably the process is characterized in that the ratio between the thickness of said second layer and the thickness of the base layer is between 0.1 to 5.

Conveniently the process is characterized in that it impresses on that second block layer a plurality of upper shapes, particularly recesses, with predetermined outline and size and for a predetermined depth.

Further conveniently the process is characterized in that it impresses a plurality of lower shapes.

In particular said upper shapes are recesses, realized onto said first base layer during said latex foam base mixture deposition.

Advantageously the process is characterized in that it gelates the latex foam block during the upper shapes impression step.

Still more advantageously the process is characterized in that it gelates said latex foam block during the upper and lower shapes impression step.

A second aspect of the invention is formed by a plant for a continuous latex foam block of un-limited length manufacture to be partitioned into a plurality of articles by cross cuts transversal to said un-limited length, comprising a latex and a latex components mixer to form a first latex foam base mixture, foaming means to form a latex foam, a laying surface in continuous advancement along a determined direction between a first and a second station, a latex foam laying device in said first station to form a first base layer on that surface in continuous advancement, a first layer shaping doctor blade, gelating means, vulcanizing means.

The plant comprises following inventive characteristics
i) at least a second laying device of a second latex foam with, relative to said first foam, different characteristics to form a second layer over at least a cross portion of said base layer;
ii) a second shaping doctor blade of said second layer positioned a predetermined distance from said first doctor blade;
iii) said second layer gelating means;
iv) unique first layer and second layers vulcanizing means.

Preferably said first and second layers gelating means forming said block are unique.

Conveniently said block gelating means comprises preheated flat metal elements, said flat elements being applied in a contiguous succession over second layer of said block.

Preferably said flat elements are of aluminum.

Advantageously the plant is characterized in that said gelating means comprises a heated chamber crossed by that laying surface and flat metal elements applied in succession and in contact over said second layer of said block upstream said chamber.

BRIEF DESCRIPTION OF THE DRAWINGS

The present invention will be now better understood from the following detailed description given by way of example and therefore non limitative referring to the accompanying drawings wherein:

FIG. 1 shows a plant schematic longitudinal view;
FIG. 2 shows in a partial perspective view a detail of FIG. 1;
FIG. 3 shows in longitudinal view a variation of some parts of FIG. 1 plant;
FIG. 4 shows in longitudinal section a two layered foam block each with recesses.

DETAILED DESCRIPTION OF THE PREFERRED EMBODIMENTS

Figure 5:
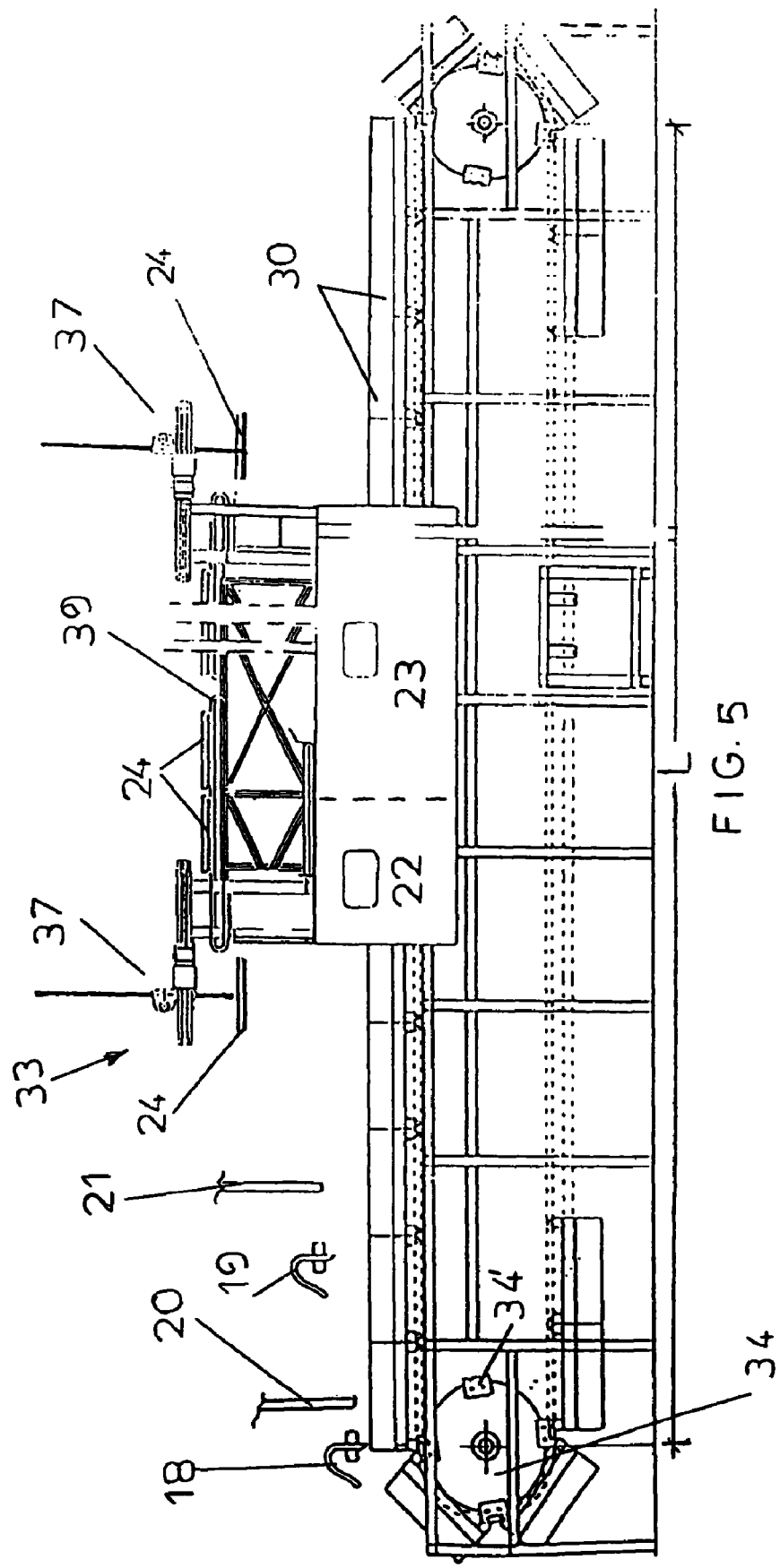
FIG. 5 shows a plant preferred embodiment.
Figure 6:
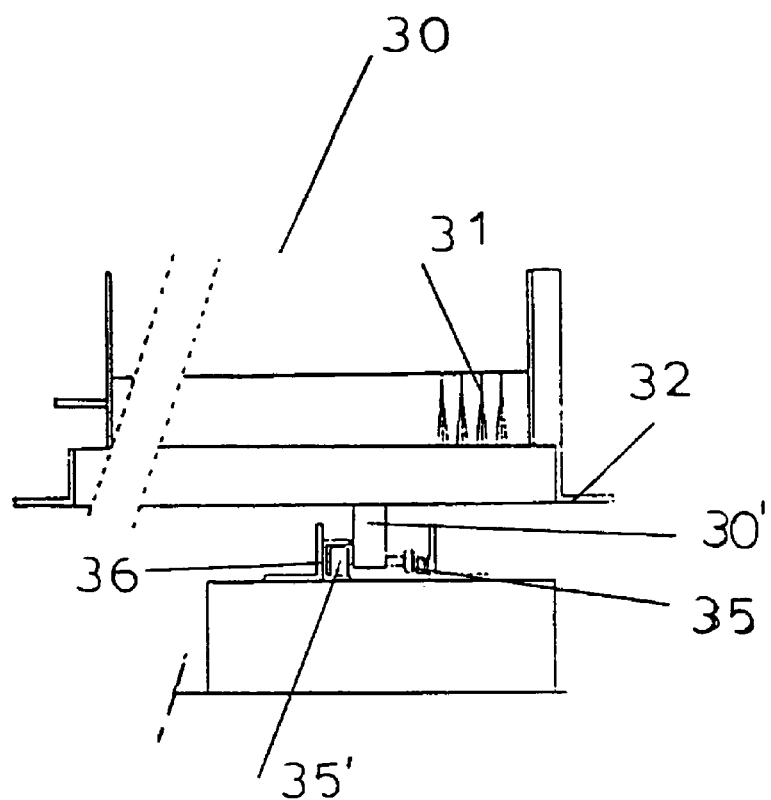
FIG. 6 shows a detail of FIG. 5.

FIG. 1 schematically shows a plant for continuously manufacturing a latex foam block 2 of un-limited length to be partitioned in a plurality of cellular rubber articles by cross cuts transversal to the block length.

In an exemplary embodiment said resting articles may be mattresses or mattress parts, a pillow or parts of a pillow.

The plant comprises a laying surface 3, for instance a metal belt continuously moved in arrow F direction between a first laying station 4 and a second extraction station 5 provided with a pair of counter rotating rollers 6.

Block 2 is extracted from the second station 5 passing through the rollers 6 pair. The plant of FIG. 1 refers to the manufacture of a block 2 formed by two latex foam layers, respectively a first one 7, or block base layer 2, with the lower surface 8 in contact with belt 3, the second one 9 with inner surface 10 in contact with the first layer 7 outer surface 11.

The plant comprises gelating means that in its most general embodiment must be able to dimensionally stabilize the latex foam and to that end use heat sources able to provide temperatures from 20° to 60° C., in the environment crossed by the latex foam block.

Such gelating means indicated as 12 in FIG. 1 are embodied in a particular shape later explained.

The plant comprises vulcanizing means 13 arranged after the gelating means 12 and between first and second stations 4, 5.

Near first station 4, a first laying device 14 of a first latex foam base mixture destined to form first base layer 7 and spaced from the first station a second laying device 15 is arranged of a second latex foam mixture destined to form second layer 9.

Said laying device 14 and 15 are arranged in a direction transverse to the belt 3 advancement direction.

It is added that said laying devices 14 and 15 are moved near or away from belt 3 in arrows "f" direction through suitable slide guides and driving means not illustrated being of any known type.

Further laying devices 14 and 15 are connected to their own latex mixers.

Said mixers comprise plural tanks and various equipment, among which control, supply, output and connection equipment.

For the sake of description brevity said mixers have been exemplified with only two tanks 16, 17 provided with appropriate connection piping to the laying heads 18, 19 from each of which the two latex foam mixtures pour out.

A conduit 16' and a conduit 17' feed both tanks 16, 17 with respective latex amounts.

Plant 1 comprises two latex foam mixture shaping doctor blades 20, 21.

First doctor blade 20 is arranged past the laying head 18.

Second doctor blade 21 is arranged upstream relative the gelating means 12.

Both doctor blades may have a shaped profile to shape the surface on which they act with a desired geometry even different from the flat one, for instance a wavy configuration with pointed or rounded ends.

The gelation of both layers may take place at different times and positions.

According to a preferred inventive characteristic gelating means 12 are unique for first and second layers.

It is further specified that the term "unique" means that the plant does not use a gelating step of a first foam layer carried out separately and independently from second layer gelating step, instead it has a single gelating step carried out at the same time and place for both layers 7 and 9 of the latex foam block 2.

Preferably gelating means 12 and vulcanizing means 13 comprise a single tunnel type device partitioned in first and second chambers 22, 23.

The tunnel is heated with appropriate heating means, preferably by heat conducting fluids and still more preferably with flowing steam.

In first chamber 22 the gelating step takes place.

Chamber 22 has an "1" length from 2% to 20% of said tunnel total length.

Still preferably gelating device 12 uses a plurality of preheated metal members 24 applied in continuous succession over second layer outer surface 9 passing both through first gelating chamber 22 and through second vulcanizing chamber 23 wherein the steam has a temperature of approximately 100° C.

Members 24, preferably with a configuration of plain plates and in aluminum, are moved along two substantially horizontal segments, respectively an active segment 25 and an inactive rest segment 26.

In the active segment, plates 24 are associated with the latex foam block 2 in continuous advance.

In the inactive rest segment, plates 24 taken out at B downstream the tunnel device are arranged at C prior to being taken back to tunnel device input A.

The plates 24 plurality is shifted along FIG. 1 ABCD configuration by driving means apt to such purpose.

Is mentioned herein as an example that said driving means may comprise lifting and lowering mechanical or pneumatic vertical drives and transport conveyor belts in upper segment CD.

In segment 25 plates 24 are solid in movement to the laying surface 3.

According to a process characteristic it was found convenient managing the process passing plates 24 previously through the tunnel device and later through the return segment up to input A at a speed between 0.3 and 1.5 meter/minute.

In such way it is obtained that plates 24 show up at the tunnel input, understandably already pre-heated, maintaining a temperature of at least 20° C. enough for the foam block gelating and size stabilizing step.

In a preferred embodiment of the plant shown in FIG. 3 said plates 24 are shaped as slabs each provided with a plurality of cantilevered protuberances 27 projecting outwards from the base and downward directed.

Such protuberances 27 have the purpose to form upper recesses 9' over the second foam layer 9 (FIG. 4).

Protuberances 27 gelate and vulcanize in depth.

Therefore in an inventive and advantageous way plates 24 form gelating means, moulding means and vulcanizing means passing through second chamber 23.

As mentioned the plant of FIG. 1 comprises a belt as a laying surface 3. In the most improved embodiment of FIG. 3 such surface may take up various embodiments, for instance it may be formed by a plurality of lower plates 30 arranged side by side and anchored transversally to two chains (not shown) arranged in an annular configuration around two pulleys one of either a drive pulley.

Such plates comprise a plurality of protuberances 31 both for moulding recesses 7' in the base layer and for gelating and vulcanizing in a diffused way.

In simple and schematic way in plant of FIG. 3 plates 24 are associated to a ring conveyor.

Such conveyor and the depositing surface 3 are moved at the same speed.

The plant of FIG. 1, as exemplified by the portion of the plant shown in FIG. 2, comprises side walls 28, 29, opposite one another and integral with laying surface 3.

Side walls 28, 29 bind both layers 7, 9 width, therefore latex foam block 2 width.

Advantageously said lateral walls 28, 29 form abutment means for the gelating and moulding means depicted by plates 24.

Now plant operation is described provided with upper 24 and lower plates 30 provided with protuberances 27 and 31 respectively for moulding upper 9' and lower 7' recesses (FIG. 4).

Such protuberances 27, 31 may have other shape than represented in the figures and may originate articles wherein lower recesses 7' and 9' are aligned or offset one to another.

Plant operation is described relative to a solution wherein plates 24 with related protuberances 27 supported by the support walls 28, 29 of surface 3, are therefore associated with block 2 in the gelating and vulcanizing segment and thereafter moved in other segments by mechanical or pneumatic commands and conveyor belts 3' driven at speed independent from surface 3 one (FIG. 3).

Initially a first natural rubber latex and a second synthetic rubber latex, such as a butadiene styrene polymer, and related components of both latex separately prepared are subjected to mixing by mechanical stirring means.

Components comprise inter alia, surfactants, vulcanization agents such as sulfur and accelerators, anti-oxidizing to inhibit aging of final article, fillers, oils, stabilizers.

Surfactants have the task of maintaining same sign electric charges, around each latex particle so that such particles reject one another avoiding premature latex particles coagulation.

Preferably the invention envisages the utilization of surfactants of anionic type and the same for both mixtures.

In this case protective charges around latex particles are negative.

Preferably anionic surfactant is potassium oleate or even more preferably potassium resinate.

Components prior to being added to latex are transformed in an aqueous dispersion with appropriate mechanical means to reduce the particle sizes.

Both dispersions are input in aqueous solutions of respective tanks 16, 17 by conduits 16', 17' wherein appropriate blade rotors (not illustrated) are activated to determine a homogeneous dispersion of materials.

In a following step, hereinafter called foaming step, air is introduced within both tanks to obtain two latex foam mixtures.

Foaming is achieved by pressurized air and contemporary mechanical stirring.

Foam density is controlled by varying the ratio between air amount and latex throughput.

The process is carried out with two different mixtures because respective materials may have different chemical properties.

Further one or more process parameters may be selected to determine a different cellular structure in both mixtures.

The process envisages the formation of two latex foam mixtures with different density.

Utilizing such characteristic one achieves initially a foam block and subsequently a plurality of mattresses wherein lower and upper layer have different characteristic from one another therefore either one may provide different performances.

In particular, in the embodiment of FIG. 1, the density of the mixture within second tank 17 is less than that of first tank 16.

The density difference is achieved providing in first tank 16 the presence of a lesser air quantity as compared to latex and in second tank 17 an air amount greater than one of latex.

According to said modes the ratio between base mixture density and second mixture density is between 1 and 10.

After foaming, gelation agent is input in respective tanks 16, 17.

Preferably said agent is the same for both mixtures.

Even preferably the gelation agent is sodium fluosilicate

Following formulations of both latex foams are provided in a table 1.

First latex foam table is indicated by numeral 1 and second latex foam is indicated by numeral 2.

In the table 1 Phr, as known, means rubber parts per cent.

TABLE 1

| Materials | Phr 1 | Phr 2 |
| --- | --- | --- |
| Natural rubber latex | 100 | 0 |
| Synthetic rubber latex | 0 | 100 |
| Potassium oleate | 2 | 0 |
| Potassium resinate | 1 | 1 |
| Anti-oxidizers | 1.5 | 0.8 |
| Zinc oxide | 5 | 2 |
| Sulfur | 2.5 | 2.5 |
| Accelerators | 2 | 2 |
| Byphenil-gualidyne | 0 | 1 |
| Gelation agent: SSF | 3 | 3 |

According to a particular process embodiment, it is provided the addition in second tank 17 of latex input together with other components single or plural fillers of flame propagation retarding materials.

Such flame retarding fillers may comprise for instance magnesium hydroxide and aluminum hydroxide.

In particular, the second mixture comprises expansible graphite, preferably from 4 to 35 Phr to 100 Phr elastomer.

After the foaming step the laying of both latex foams step is carried out.

To that end, head 18 is displaced by drives provided in first laying device drives 14 in one direction and in an opposite one transverse to rectilinear displacement direction of laying surface 3.

The two displacements combination forms a first layer 7 or base layer of foam block 2 shaped at a predetermined height by the first doctor blade 20 action.

A first layer thickness comprised between 10 and 25 cm corresponds to such height.

The first foam layer 7 moves forward with its lower surface 8 associated with laying surface 3 provided with related protuberances 31 towards the second laying device 15 positioned at a predetermined distance "d" from first laying device 14.

According to a method embodiment it has been predicted that plant of FIG. 1 has a length "L" between 25 to 50 m measured from first to second station 4, 5.

Relative to length "L" it was found convenient that said distance "d" be comprised between 0.5 to 2.5 m.

Similar to that already described, head 19 is displaced in its turn by the drives provided in second laying device 15 in a transverse direction to the straight displacement direction of first foam layer 7 forming a second foam layer shaped to a second predetermined height by second doctor blade 21.

To said second predetermined height corresponds a layer 9 thickness comprised between 2 to 20 cm.

Both foam layers 7 and 9, still dimensionally unstable, move forward towards gelating device 12 first chamber 22; the first chamber 22 is located a predetermined distance "T" relative to second doctor blade 21.

Conveniently distance "T" between the last laid layer and the gelating device, whatever the overlaid layers number, is comprised between 1 and 2 m.

It is to be noted that the particular porous structure of first and second layer cellular structure assists in determining the bond between the two layers.

As a matter of fact during block 2 displacement along segment "T" occurs a gravity penetration of small protuberances in lower zone of a layer in the infinite small microcavities of other layer upper zone and vice versa.

During the passage through first chamber 22 block 2 absorbs heat from steam being present in the environment as well as by thermal conduction of pre-heated plates 24 and 30.

It is to be noted that during such passage protuberances 27 and 31 both in aluminum are embedded respectively in first and second layer.

In chamber 22 gelating step takes place.

The sodium fluosilicate provides positive electric charges that work against negative electric charges around latex particles causing the end of the repulsive phase between such particles.

Latex particles under effect of heat transmitted from plates 24, 30 and steam are subjected to vibrations whose effect is to cause fast reciprocal approach and back off movements.

Latex particles touch one another and being in a still plastic state join among themselves determining block 2 coagulation.

In particular, latex particles boundary surface nearest the between layers 7, 9 join among themselves thank to their tackiness.

Therefore block 2 passing through first chamber 22 is dimensionally stabilized and both layers 7, 9 are chemically bonded along the contact surface.

During block 2 advance through chamber 23 a cross-linking occurs during which sulfur and accelerators give rise to sulfur bridges between rubber particles.

Therefore the bond of both layers along contiguous surfaces is further enhanced.

Is now described in FIG. 5 a preferred embodiment of plant 33 for continuous manufacture of a latex foam block 2 comprising at least two layers 7, 9 with upper and lower recesses (FIG. 4).

The following description uses the same reference numerals of FIGS. 1-3 as far as some elements having similar implementation or function; in the following description plant 33 uses carriages instead of lower plates.

Plant 33 comprises in a way known by itself a laying surface made up from a plurality of carriages 30 (FIG. 5, 6) each with protuberances 31 moved along an annular circuit comprising two teethed pulleys one of which driver, the other a driven one.

Support block 30' in each carriage base carries a pair of rollers 35, whose small spindles gear up with grip means 34' of both pulleys.

The carriages are pushed by a drive wheel one in contact to another along the upper active branch in which they receive both latex foams by laying heads 18, 19.

Carriages 30 displacement along annular circuit occurs via rollers 35 and wheels 35' sliding along a stationary structure suitable guides 36.

The lower branch carriages may be less in number relative to the upper branch ones and in this solution moved by displacement means, such as conveyors or the like, in a manner independent from driving pulley drives, at a higher speed than the upper branch.

In the end branch carriages abut with side flanges 32 on conveyors.

Figure 7:
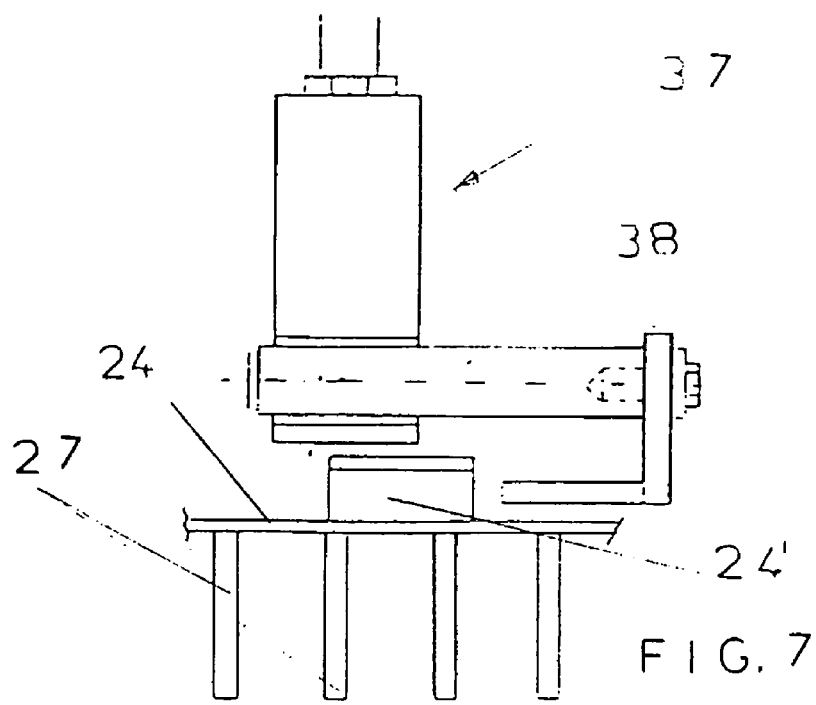
FIG. 7 shows a further detail of FIG. 5.

Plant upper part comprises a plurality of plates 24 (FIGS. 5, 7) each of which is provided with a plurality of protuberances 27 destined to form recesses on the second foam layer.

Such plates 24 are moved along annular circuit already depicted with ABCD in FIG. 1.

Plant 33 comprises plates 24 lifting and lowering means.

Said means known by themselves, comprise vertical and horizontal mechanical commands or as depicted pneumatic commands 37, this latter displacement being carried out through member 38 apt to gripping in opening 24' of each plate 24.

Displacement of plates 24 in the upper branch is carried out by conveyors 39.

Advantageously is a FIG. 5 plant innovative part that plates 24 and their protuberances 27 form contemporarily gelating means, moulding means and vulcanizing means.

The characteristic of moulding means formed by a plurality of hot plates as previously described allows transmitting by conduction the heat needed for gelating avoiding to resort to heating lamps and similar thermal radiation apparatuses with obvious energy savings vis-á-vis plural continuous plant working cycles.

Moreover, process according to the invention can form an attachment surface 40 of high mechanical strength between contact surfaces of two layers 7, 9.

It is believed that attachment surface high mechanical strength may depend both from free particles chemical bond obtained during gelating step and from penetration of microporous structure of both layers.

Further, the profile of attachment surface 40 is substantially parallel to block base surface, therefore stirring of both layers cellular structures is absent.

In other words the one layer cellular structure material, selected at the beginning with determined and desired characteristics, does not penetrate deeply in the cellular structure of the other layer predicted at the beginning with other determined and desired characteristics.

Therefore the process according to the invention maintains unchanged properties and performances of both layers.

Further carrying out the process according to what was described in the FIG. 5 example allows depositing, if so desired, a heavier layer as compared with the first layer without altering its properties.

Figure 8:
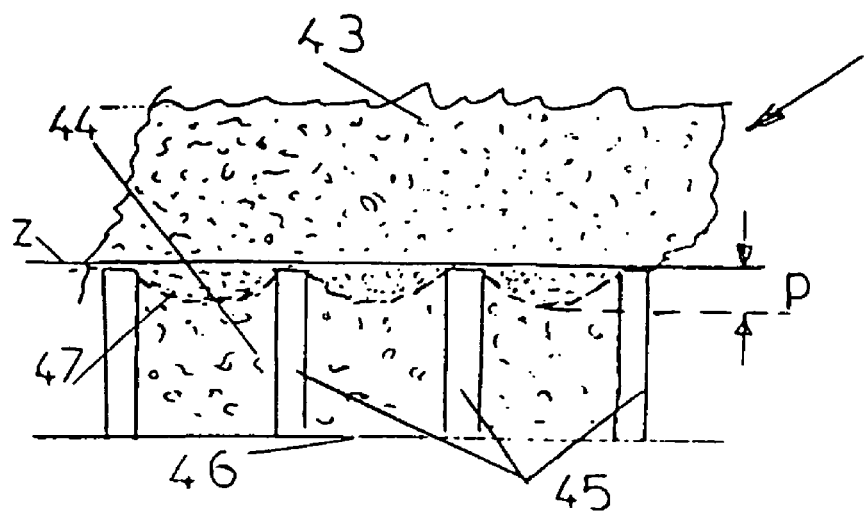
FIG. 8 shows in longitudinal section the upper layer weight effect.
Figure 9:
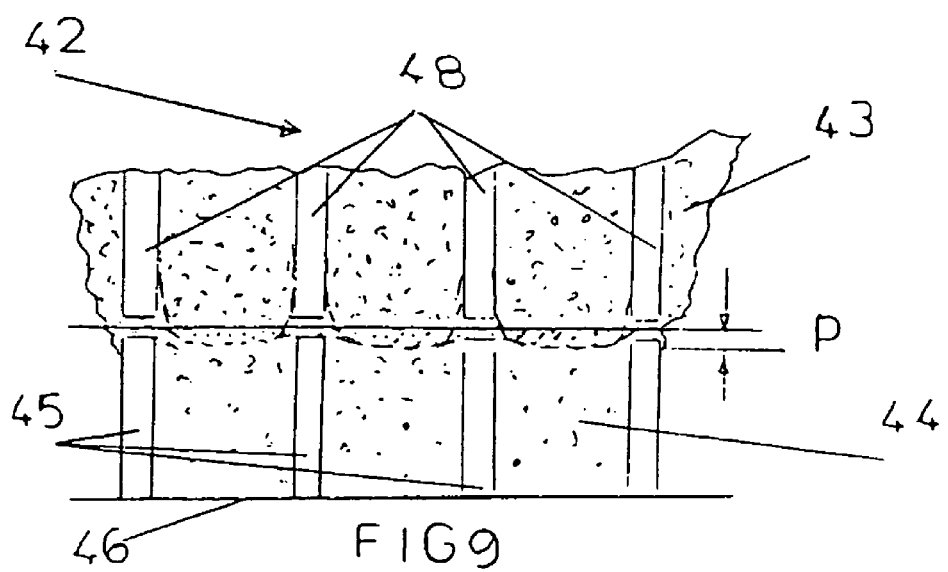
FIG. 9 shows the upper layer weight reduction effect.

This result may be qualitatively explained with the aid of FIGS. 8 and 9 schematizations.

FIG. 8 relates to a foam block 42 made up by two overlaid layers 43, 44 obtained by a process wherein only lower protuberances 45 of laying surface 46 are present.

In the same figure straight line "z" has been outlined corresponding to upper ends of lower protuberances 45.

Upper layer weight effect on lower layer is made evident by curvilinear segments 47 visible between adjacent protuberances and by said segments flexure arrows "p".

The result made evident by such FIG. 8 may be acceptable, but it might be susceptible to improvements when it is desired to have a noticeably heavier upper layer as compared to the base layer.

In this respect FIG. 9 shows the benefits obtained utilizing a process according to the invention with already described deposition, gelating and vulcanization steps and wherein latex foam block cellular structure is obtained using lower 45 and upper 48 protuberances indicated for sake of simplicity aligned one to another.

The same FIG. 9 shows that the effect of upper layer weight on the former has been considerably reduced because upper protuberances walls 48 tend to retain the cellular foam mass from sliding downwards reducing arrow "p" values to minimum values.

Therefore upper layer compression on the former, even of high weight, does not induce noticeable alterations of upper layer density and functions.

It is to be further remarked that the invention is not limited to the continuous formation of only two latex foam layers but it is rather extended to continuous formation of a number of layers greater than two provided that whatever is the number of layers to be overlaid deposition of each layer occurs after having shaped a previous layer at a predetermined height and preferably all layers be gelated at the same time and in the same operative station.

The invention claimed is:

1. Process for continuous manufacture of a block of latex foam of un-limited length to be partitioned in a plurality of mattresses by transversal cuts to said un-limited length, comprising the steps of:
    preparing a latex formed by various particles and by a surfactant to originate a barrier contrasting the approach among said latex particles,
    forming a first latex and components base mixture,
    introducing into said first base mixture a foaming agent,
    then foaming the first base mixture,
    then introducing into said foamed first base mixture a gelation agent destined to break said barrier,
    advancing along a predetermined direction a preheated metal laying surface provided with protuberances to mould recesses between a first and a second station and for gelating and vulcanising in a diffused way, the length measured between the two stations being between 25 m to 50 m,
    laying at that first station said first foamed base mixture containing the gelating agent over said preheated laying surface with protuberances in continuous advancement and forming a first base layer of latex foam of un-limited length with recesses moulded into the first base layer, the moulding of recesses into the first base layer comprising the protuberances impressing the recesses into the deposited first foamed base mixture during said latex foam base mixture laying;
    shaping said first base layer with recesses to a height between 10 cm and 25 cm;
    preparing a second latex foam mixture comprising said surfactant and said gelation agent;
    the second latex foam mixture and the foamed first base mixture having different densities, wherein the ratio between the second latex foam mixture and the foamed first base mixture density is between >1 and 10, characterized in foaming the second mixture with an air amount different from the first base mixture so the resulting layers of the block of latex foam differ in density;
    laying after the first layer shaping step said second mixture over at least a partial cross extension of said first base layer and forming a second latex foam upper layer so the second layer contacts the first layer;
    shaping said second layer to a predetermined height between 5 cm and 20 cm, wherein the ratio between said second layer thickness and said base layer thickness is between 0.5 and 1;
    moving after said shaping of the second layer said first base layer and said second upper layer both still dimensionally unstable a distance "T" comprised between 1 m and 2 m, so co-penetration of the two layers consists of a gravity penetration of micro-porous structure of both layers;
    gelating said first layer and gelating said second layer;
    said gelating comprising thermal conduction of heat from the pre-heated said metal laying surface with protuberances towards the first layer and second layer, wherein gelating said first layer comprises gelating a portion of said first layer during the impressing of recesses step;
    vulcanising both said gelated layers simultaneously;
    advancing towards the second station said latex foam block formed by at most said two layers.

2. The process of claim 1, wherein the first station where the first base mixture is laid and a second laying station where the second latex foam mixture is laid are 0.5 to 2.5 m apart.

3. Process according to claim 2, characterized by the step of gelating said layers at a temperature between 20° C. and 60° C.

4. Process according to claim 1,
comprising:
differentiating composition of said second mixture from composition of the first mixture so the resulting layers of the block of latex foam differ in at least one characteristic selected from the group consisting of hardness, elastic deformation, and mechanical strength.

5. Process according to claim 1, wherein the gelating of the first layer and second layer further comprises gelating the first layer and second layer in the same position and at the same time bonding said two layers contiguous surfaces by contact among latex particles of both foams after breaking said barrier.

6. Process according to claim 1, characterized by the step of gelating said layers at a temperature between 20° C. and 60° C.

7. Process according to claim 1, characterized in depositing two mixtures of similar composition, the second mixture and the first base mixture having different densities.

8. Process according to claim 1, wherein gelating the first layer and the second layer further comprises gelating said second layer thickness and said base layer thickness simultaneously.

9. Process according to claim 8, characterized in that said first and second layers pass through a tunnel partitioned as a first and second chamber in series, said gelating of the first and second layers comprising gelating in the first chamber, in the second chamber the vulcanizing takes place wherein the tunnel is heated with steam, the first chamber has a length from 2 to 20% of a total length of the tunnel.

10. Process according to claim 1, characterized by adding flame retardant material fillers to at least one of said mixtures.

11. Process according to claim 10, wherein said flame retardant material is expandable graphite.

12. Process according to claim 1, characterized in imprinting on said block second layer a plurality of upper shapes with predetermined contour and sizes and to a predetermined depth.

13. Process according to claim 1, wherein a first shaping doctor blade shapes said first layer,
said second latex foam mixture with different characteristics different from those of said first base foam mixture;
a second shaping doctor blade shapes said second foam layer, said second doctor blade being is located a predetermined distance from said first doctor blade; and
the first and second layers are vulcanized in a unique vulcanizing means for the first and second layers.

14. Process according to claim 13, characterized in applying in contiguous succession on said block second layer block gelating means comprising preheated flat metal members.

15. Process according to claim 13, characterized in that said gelating of the first and second layers comprises gelating in a first heated chamber crossed by said laying surface and flat metal members applied in succession and in contact on said block second layer upstream of said first chamber.

16. Process according to claim 15, characterized in that said first chamber is followed by a second vulcanization chamber for said vulcanizing.

17. Process according to claim 13, characterized in that it comprises imprinting upper shapes with moulding means on said second layer of said block, said moulding means for imprinting upper shapes and protuberances to mold recesses in said base layer coinciding with gelating means for the second layer and base layer, respectively, to be of similar realization and location for both said layers.

18. Process according to claim 17, wherein the metal laying surface is provided with a first plurality of said protuberances, said upper shapes moulding means and block gelating means comprise a plurality of flat metal members consisting of plates each provided with a second plurality of cantilevered protuberances,
wherein the first foam layer contacts the second foam layer while the first plurality of said protuberances is positioned within the first foam layer and the second plurality of said cantilevered protuberances is positioned within the second foam layer.

19. Process according to claim 18, characterized in that said moulding and gelating means plates are moved along two substantially horizontal segments, respectively, an active segment wherein the plates are associated with said foam block and an inactive rest segment, displacement means being provided of said plates along the inactive rest segment and between said two segments.

20. Process according to claim 17, comprising support means for said moulding and gelating means.

21. Process according to claim 13, characterized in that said laying surface, comprises opposite side walls bounding said latex foam block width, said side walls supporting said foam block gelating means.

22. Process according to claim 13, characterized in that said laying surface is moved along a loop comprising two horizontal branches, respectively an upper branch between first and second station and a lower return branch, said branches being connected by arcs of circle.

23. Process according to claim 1, comprising providing an attachment between contact surfaces of said two layers having in a longitudinal section curvilinear segments between adjacent protuberances of said metal laying surface.

24. Process according to claim 1, characterized by providing between said first base layer and said second layer upper foam an attachment surface of high mechanical strength depending both from chemical bonding obtained during gelation step and from penetration of microporous structure of both layers, said attachment surface being formed by curvilinear segments between adjacent protuberances substantially parallel to the first base layer deposited on said laying surface.

25. The process of claim 1,
wherein the first foam layer and the second foam layer contact while a first plurality of protuberances is positioned within the first foam layer and a second plurality of protuberances is positioned within the second foam layer, wherein a plurality of appendices of the first latex material penetrates into a plurality of micro-cavities of the second layer.

26. The process of claim 25, wherein heat is transmitted into the first layer through the first plurality of protuberances; and further comprising transmitting heat into the second foam layer through the second plurality of protuberances positioned in the second layer.

27. The process of claim 25, wherein a curvilinear segment comprising a portion of the first latex material deforms a surface of the second foam layer between adjacent protuberances of the second plurality of protuberances.

28. The process of claim 25, wherein the first station where the first base mixture is laid and a second laying station where the second latex foam mixture is laid are 0.5 to 2.5 m apart.

29. Process according to claim 28, characterized by the step of gelating said layers at a temperature between 20° C. and 60° C.

* * * * *